United States Patent
Nagai et al.

(10) Patent No.: US 7,067,990 B2
(45) Date of Patent: Jun. 27, 2006

(54) PROJECTION TYPE VIDEO DISPLAY

(75) Inventors: Hisashi Nagai, Daito (JP); Hiroshi Nakamura, Nara (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 11/033,110

(22) Filed: Jan. 12, 2005

(65) Prior Publication Data

US 2005/0151483 A1 Jul. 14, 2005

(30) Foreign Application Priority Data

Jan. 14, 2004 (JP) ............................ 2004-006650
Nov. 24, 2004 (JP) ............................ 2004-338777

(51) Int. Cl.
*H05B 37/02* (2006.01)

(52) U.S. Cl. .................. 315/224; 315/307; 315/DIG. 5

(58) Field of Classification Search ..................... None
See application file for complete search history.

(56) References Cited

U.S. PATENT DOCUMENTS

| 5,483,127 | A | * | 1/1996 | Widmayer et al. | ........... 315/307 |
| 2003/0098659 | A1 | * | 5/2003 | Okamoto et al. | ........... 315/291 |

* cited by examiner

*Primary Examiner*—David Vu
(74) *Attorney, Agent, or Firm*—Westerman, Hattori, Daniels & Adrian, LLP.

(57) ABSTRACT

A projection type video display reduces the flicker in projection images caused by the brightness fluctuation of a light source lamp regardless of the kind of lamp used as a light source lamp. The projection type video display includes a driving control circuit for a light source lamp to control a discharge voltage of the light source lamp to prevent flicker caused by brightness fluctuation.

18 Claims, 2 Drawing Sheets

PROJECTION TYPE VIDEO DISPLAY

CROSS REFERENCE TO RELATED APPLICATIONS

This application is based upon and claims priority of Japanese Patent Applications No. 2004-006650 and No. 2004-338777, the contents of which are incorporated herein by reference.

BACKGROUND OF THE INVENTION

1. Field of the Invention

The present invention relates to a projection type video display, such as a liquid crystal projector, including a light source lamp and a light valve to display a video image by modulating the brightness of the light source lamp.

2. Description of the Related Art

High-pressure discharge lamps have a high brightness feature and are commonly used as lamps for projection type video displays, such as liquid crystal projectors.

However, a problem with conventional high pressure discharge lamps is that the movement of discharge position causes fluctuation in lamp brightness and degradation of image quality as a result of flicker in the projection image.

It is well known to prevent this movement of the discharge position in the conventional high pressure discharge lamp by using the lamp, which is set at the rated electrical power per arc length, as a light source lamp in the projection type video display, and applying to the lamp an alternating voltage having a frequency causing minimal change the brightness of the lamp (for example JP 2000-323287).

However, the temperature of the lamp, the alteration of an electrode shape and the fluctuation of voltage applied are likely to cause the movement of the discharge position. If the discharge position is moving, it has the drawback of causing the fluctuation of the projection image continuously because its state isn't able to be detected and the position moved isn't returned to the former position.

If you exchange the specified lamp for a general lamp at the end of its effective duration, the specified frequency doesn't have any effect on a general lamp with respect to reducing the movement of discharge position in the general lamp. Therefore it also has the drawback of causing the movement of discharge position.

SUMMARY OF THE INVENTION

In accordance with embodiments of the present invention, a projection type video display is provided which can reduce the flicker in the projection image caused by the brightness fluctuation of a light source lamp regardless of the kind of lamp used as a light source lamp.

In accordance with embodiments of the present invention, a driving control circuit for a light source lamp is provided that controls a discharge voltage of the light source lamp to prevent flicker caused by brightness fluctuation.

In accordance with embodiments of the present invention, a projection type video display includes a light source lamp; means for providing driving electric power to the light source lamp; detecting means for detecting a discharge voltage of the light source lamp; monitoring means for monitoring the discharge voltage of the light source lamp; determining means for determining whether the discharge voltage of the light source lamp fluctuates based on the output the monitoring means; transforming means for transforming an amplitude and/or a frequency of a driving power of the light source lamp in response to the determining means determining that the discharge voltage of the light source lamp is fluctuating; and means for returning the amplitude and/or the frequency of the driving power of the light source lamp to its initial state when fluctuation of the discharge voltage of the light source lamp is reduced by transforming the amplitude and/or the frequency of the driving power of the light source lamp.

In accordance with embodiments of present invention, a projection type video display includes transforming means increases both the amplitude and the frequency of the driving power of the light source lamp.

In accordance with embodiments of present invention, a projection type video display includes transforming means increases either the amplitude or the frequency of the driving power of the light source lamp.

In accordance with embodiments of present invention, a projection type video display includes transforming means additionally increases both the amplitude and the frequency of the driving power of the light source lamp when the fluctuation of the discharge voltage isn't reduced even though the amplitude and the frequency of the driving power of the light source lamp are increased once.

In accordance with embodiments of present invention, a projection type video display includes transforming means additionally increases either the amplitude or the frequency of the driving power of the light source lamp when the fluctuation of the discharge voltage isn't reduced even though the amplitude or the frequency of the driving power of the light source lamp is increased once.

In accordance with embodiments of present invention, a projection type video display includes means for stopping the discharge of the light source lamp when the amplitude and/or the frequency of the driving power of the light source lamp exceed a predetermined value.

In accordance with embodiments of present invention, the discharge of the light source lamp may be stopped, in case that the discharge voltage of the light source lamp doesn't return to the state which it doesn't fluctuate even if the amplitude and/or the frequency of the driving power of the light source lamp are increased beyond the predetermined value when the discharge voltage of the light source lamp is fluctuating.

In accordance with embodiments of the present invention, the flicker in projection image can be reduced because a movement of discharge position is returned to a former state regardless of the kind of lamp used as a light source lamp by detecting the state in which the discharge voltage is fluctuating and increasing the amplitude and/or the frequency of the driving power of the light source lamp.

In accordance with embodiments of the present invention, by stopping the discharge of the light source lamp in case that the amplitude and/or the frequency of the driving power of the light source lamp exceed the predetermined value, an extreme drop in the lifetime of the light source lamp can be prevented and an explosion of the light source lamp can be avoided.

BRIEF DESCRIPTION OF THE DRAWING

The above embodiments of the present invention will become apparent and more readily appreciated from the following description of the preferred embodiments taken in conjunction with the accompanying drawings, of which.

DESCRIPTION OF THE PREFERRED EMBODIMENTS

Figure 1:
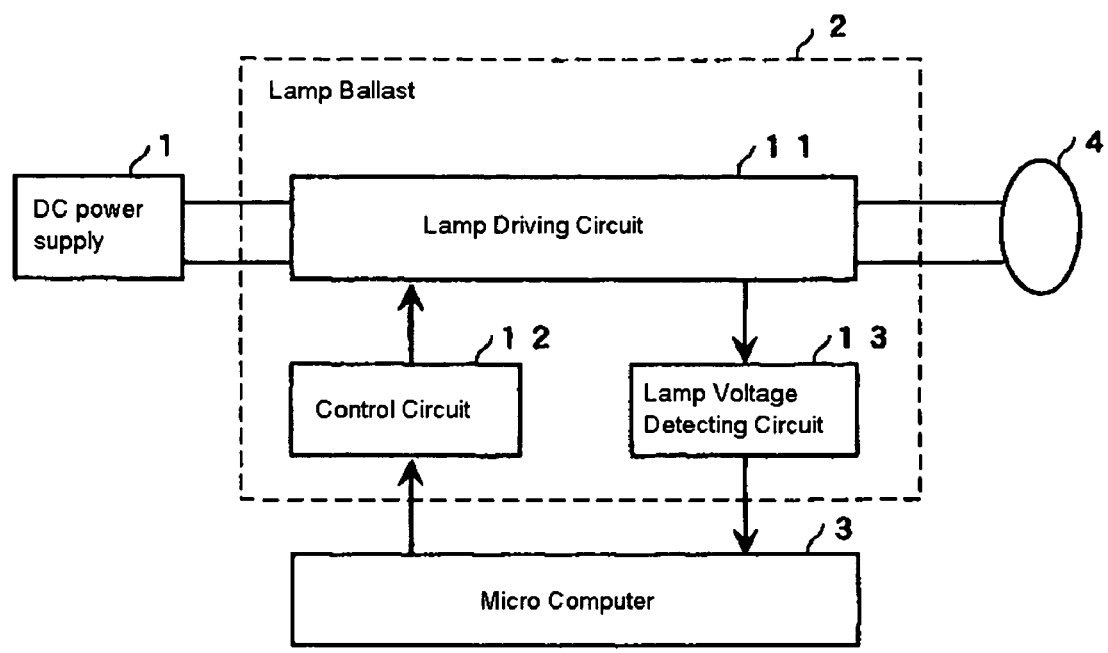
FIG. 1 is a block diagram of a driving control circuit for a light source lamp which is preferably used in a projection type video display in accordance with embodiments of the present invention.

Reference will now be made in detail to the preferred embodiments of the present invention, examples of which are illustrated in the accompanying drawings, wherein like reference numerals refer to like elements throughout.

Embodiments of the present invention will now be described below with reference to FIGS. 1 to 2.

FIG. 1 illustrates a driving control circuit 10 for a light source lamp 4 which is preferably used in a projection type video display. As shown in FIG. 1, the driving control circuit 10 for the light source lamp 4 includes a DC power supply circuit 1, lamp ballast 2, and a microcomputer 3. The light source lamp 4 is preferably a high-pressure discharge lamp driven by AC power. The high-pressure discharge lamp may be any of a variety of types of lamps, such as a metal halide lamp, a high-pressure mercury lamp, a xenon lamp or other equivalent lamp.

Lamp ballast 2 includes a lamp driving circuit 11, which converts DC power supplied from the DC power supply circuit 1 to AC power and supplies AC power to the light source lamp 4. A control circuit 12 provides a control signal to the lamp driving circuit to control an amplitude and a frequency (discharge frequency) of a driving power (discharge power) output from the lamp driving circuit 11. A lamp voltage detecting circuit 13, which is connected to the lamp driving circuit 11, detects a voltage between lamp electrodes (hereinafter referred to as 'discharge voltage') when the light source lamp 4 is lighted.

A discharge voltage detected by the lamp voltage detecting circuit 13 is provided to the microcomputer 3. The microcomputer 3 monitors the discharge voltage detected by the lamp voltage detecting circuit 13 and determines whether the brightness of the light source lamp 4 fluctuates based on whether the discharge voltage fluctuates, and controls the control circuit 12 to reduce the fluctuation of the discharge voltage.

Figure 2:
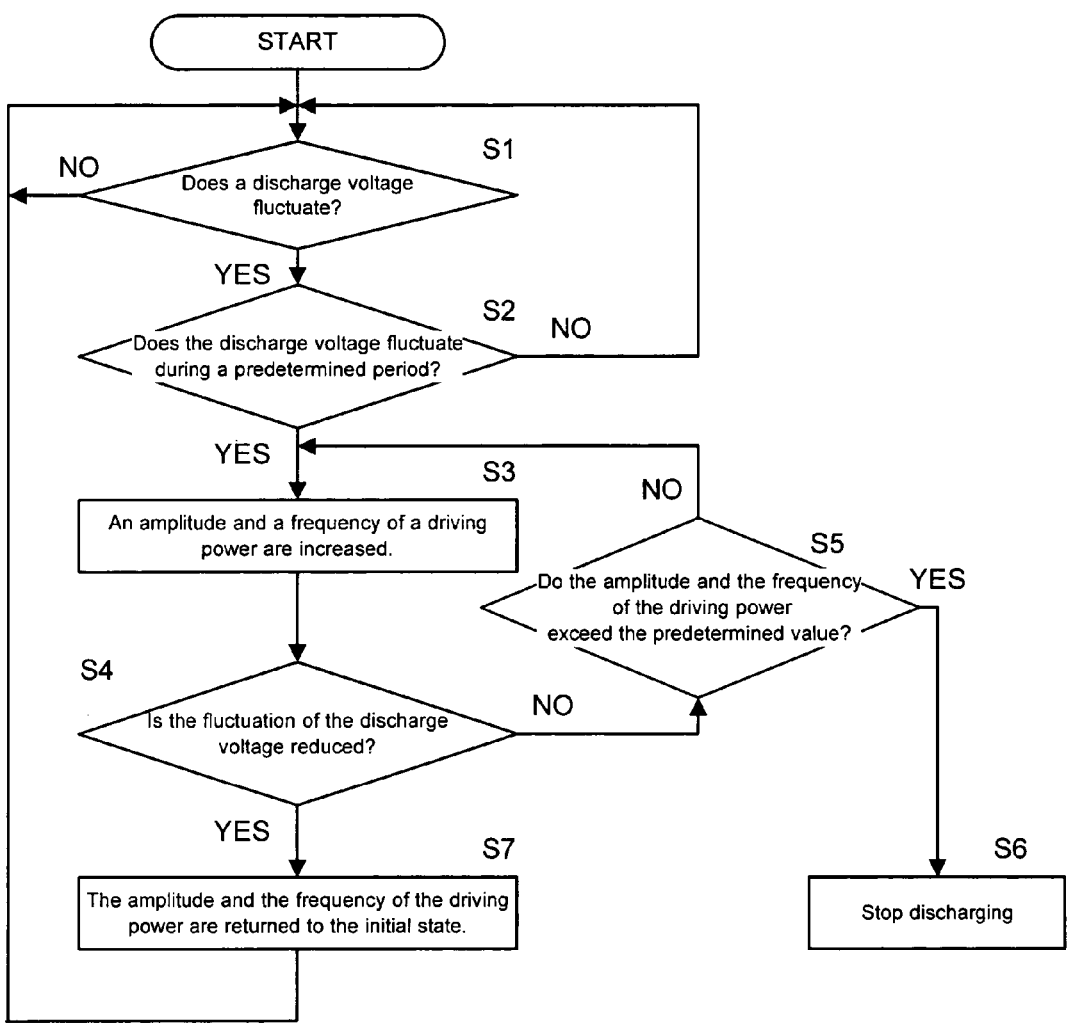
FIG. 2 is a flowchart showing an operational control process for controlling the light source lamp using a microcomputer in accordance with embodiments of the present invention.

The concrete control to reduce the fluctuation of the discharge voltage is described on the basis of an operational control process for controlling the light source lamp under control by the microcomputer 3 as shown in FIG. 2.

When the light source lamp 4 is turned on, the microcomputer 3 monitors its discharge voltage, which is detected by the lamp voltage detecting circuit 13, and determines whether or not the discharge voltage fluctuates, in fact, whether or not the discharge voltage increases beyond 1% of the standard discharge voltage (Step 1), the standard discharge voltage is a discharge voltage obtained by setting the lamp at the rated electrical power causing the lamp to discharge at the rated discharge voltage. Since the determination may include a temporary increase of the discharge voltage by the temperature of the lamp, the alteration of electrode shape and the fluctuation of voltage applied, in step 2 the microcomputer determines whether or not the discharge voltage fluctuates during the predetermined period, in fact, about 1 second period in this embodiment.

When the discharge voltage does not fluctuate during the predetermined period ('No' at the Step 1 or 'No' at the Step 2), the control process returns to Step 1. However, when the microcomputer 3 determines that the discharge voltage fluctuates ('Yes' at the Step 2), the microcomputer 3 controls the control circuit 12 to increase both of the amplitude and the frequency of the driving power of the light source lamp 4 of which are output from the lamp driving circuit 11 (Step 3). In the Step 3, the rate of their increase is about 2% of the initial state.

Thus, by increasing both of the amplitude and the frequency of the driving power of the light source lamp 4, the fluctuation of discharge position in the light source lamp 4 is reduced by raising a gas temperature in the light source lamp 4. Further, by increasing both of the amplitude and the frequency of the driving power of the light source lamp 4, the fluctuation of discharge position in the light source lamp 4 is quickly reduced by effectively raising a gas temperature in the light source lamp 4 in a short time.

The microcomputer 3 monitors the discharge voltage, which is detected by the lamp voltage detecting circuit 13, and determines whether or not the fluctuation of the discharge voltage is reduced (Step 4). When the fluctuation of the discharge voltage isn't reduced, the microcomputer 3 determines whether or not the amplitude and the frequency of the driving power of the light source lamp 4 exceed the predetermined value (Step 5). When they don't exceed the predetermined value, the control process returns to Step 4, and both of the amplitude and the frequency of the driving power of the light source lamp 4 are additionally increased by the control of the control circuit 12.

In the Step 5, when the amplitude and the frequency of the driving power of the light source lamp 4 exceed the predetermined value, the microcomputer 3 determines that the lifetime of the light source lamp 4 has little time left and that the discharge position cannot be returned to former state even though the amplitude and the frequency of the driving power of the light source lamp 4 are increased any further. And the microcomputer 3 stops having the light source lamp 4 discharge (Step 6).

In the Step 4, when the discharge voltage returns to about initial voltage, in fact, less than 1% error against the standard discharge voltage, the microcomputer 3 determines that the fluctuation of the discharge voltage is reduced. And the microcomputer 3 controls the control circuit 12 to return both of the amplitude and the frequency of the driving power of the light source lamp 4, of which are output from the lamp driving circuit 11, to the initial state (Step 7).

Embodiments of the present invention have been described above with reference to increasing both the amplitude and the frequency of the driving power of the light source lamp 4 (Step 3). However, the present invention is not limit to increasing both the amplitude and the frequency of the driving power, and either one of the amplitude and the frequency of the driving power of the light source lamp 4 may be increased.

Although a few preferred embodiments of the present invention have been shown and described, it will be appreciated by those skilled in the art that changes may be made in these embodiments without departing from the principals and spirit of the invention, the scope of which is defined in the appended claims and their equivalents.

What is claimed is:

1. A projection type video display comprising:
   a light source lamp;
   means for providing driving electric power to the light source lamp;

detecting means for detecting a discharge voltage of the light source lamp;

monitoring means for monitoring the discharge voltage of the light source lamp;

determining means for determining whether the discharge voltage of the light source lamp fluctuates based on the output the monitoring means;

transforming means for transforming an amplitude and/or a frequency of a driving power of the light source lamp in response to the determining means determining that the discharge voltage of the light source lamp is fluctuating; and means for returning the amplitude and/or the frequency of the driving power of the light source lamp to its initial state when the fluctuation of the discharge voltage of the light source lamp is reduced by transforming the amplitude and/or the frequency of the driving power of the light source lamp.

2. The projection type video display according to claim 1, wherein the transforming means increases both the amplitude and the frequency of the driving power of the light source lamp.

3. The projection type video display according to claim 1, wherein the transforming means increases either the amplitude or the frequency of the driving power of the light source lamp.

4. The projection type video display according to claim 1, wherein the transforming means additionally increases both the amplitude and the frequency of the driving power of the light source lamp when the fluctuation of the discharge voltage isn't reduced even though the amplitude and the frequency of the driving power of the light source lamp are increased once.

5. The projection type video display according to claim 1, wherein the transforming means additionally increases either the amplitude or the frequency of the driving power of the light source lamp when the fluctuation of the discharge voltage isn't reduced even though the amplitude or the frequency of the driving power of the light source lamp is increased once.

6. The projection type video display according to claim 1, further comprising means for stopping the discharge of the light source lamp when the amplitude and/or the frequency of the driving power of the light source lamp exceed a predetermined value.

7. A projection type video display comprising:

a detecting circuit to detect a discharge voltage of light source lamp;

a microcomputer to determine whether or not the discharge voltage of the light source lamp fluctuates by monitoring the discharge voltage of the light source lamp which is detected by the detecting circuit;

a control circuit to transform the amplitude and/or the frequency of the driving power of the light source lamp when the discharge voltage of the light source lamp fluctuates; and to return the amplitude and/or the frequency of the driving power of the light source lamp to its initial state when the discharge voltage of light source lamp does not fluctuate by transforming the amplitude and/or the frequency of the driving power of the light source lamp.

8. The projection type video display according to claim 7, wherein the control circuit increases both the amplitude and the frequency of the driving power of the light source lamp.

9. The projection type video display according to claim 7, wherein the control circuit increases either the amplitude or the frequency of the driving power of the light source lamp.

10. The projection type video display according to claim 7, wherein the control circuit additionally increases both the amplitude and the frequency of the driving power of the light source lamp when the fluctuation of the discharge voltage isn't reduced even though the amplitude and the frequency of the driving power of the light source lamp are increased once.

11. The projection type video display according to claim 7, wherein the control circuit additionally increases either the amplitude or the frequency of the driving power of the light source lamp when the fluctuation of the discharge voltage isn't reduced even though the amplitude or the frequency of the driving power of the light source lamp is increased once.

12. The projection type video display according to claim 7, wherein the microcomputer stops the discharge of the light source lamp when the amplitude and/or the frequency of the driving power of the light source lamp exceed the predetermined value.

13. An operation method of a projection type video display comprises the step of:

detecting a discharge voltage of a light source lamp;

monitoring the discharge voltage of the light source lamp;

determining whether the discharge voltage of the light source lamp fluctuates based on the monitoring step;

transforming an amplitude and/or a frequency of a driving power of the light source lamp in response to the determining step determining that the discharge voltage of the light source lamp is fluctuating;

determining whether the fluctuation of the discharge voltage of the light source lamp is reduced in response to the transforming step;

returning the amplitude and/or the frequency of the driving power of the light source lamp to its initial state when the fluctuation of the discharge voltage of the light source lamp is reduced by transforming the amplitude and/or the frequency of the driving power of the light source lamp.

14. The operation method of the projection type video display according to claim 13, wherein the transforming step comprises increasing both the amplitude and the frequency of the driving power of the light source lamp.

15. The operation method of the projection type video display according to claim 13, wherein the transforming step comprises increasing either the amplitude or the frequency of the driving power of the light source lamp.

16. The operation method of the projection type video display according to claim 13, wherein the transforming step comprises additionally increasing both the amplitude and the frequency of the driving power of the light source lamp when the fluctuation of the discharge voltage isn't reduced even though the amplitude and the frequency of the driving power of the light source lamp are increased once.

17. The operation method of the projection type video display according to claim 13, wherein the transforming step comprises additionally increasing either the amplitude or the frequency of the driving power of the light source lamp when the fluctuation of the discharge voltage isn't reduced even though the amplitude or the frequency of the driving power of the light source lamp is increased once.

18. The operation method of the projection type video display according to claim 13, further comprising the step of;

stopping the discharge of the light source lamp when the amplitude and/or the frequency of the driving power of the light source lamp exceed a predetermined value.

* * * * *